United States Patent Office 3,591,335
Patented July 6, 1971

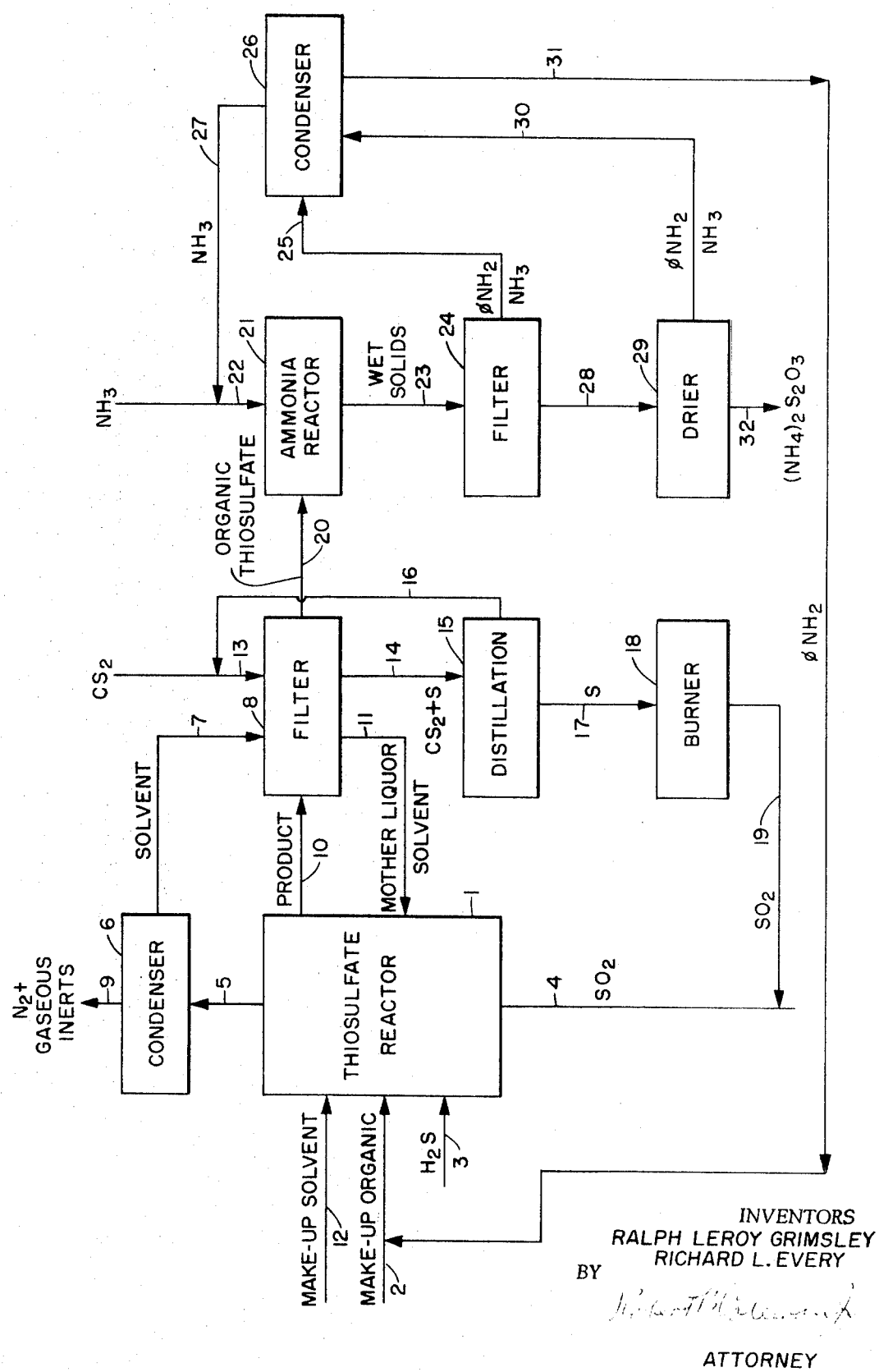

3,591,335
METHOD OF PREPARING AMMONIUM THIOSULFATE FROM AMINE THIOSULFATES
Ralph Leroy Grimsley and Richard L. Every, Ponca City, Okla., assignors to Continental Oil Company, Ponca City, Okla.
Original application Feb. 27, 1967, Ser. No. 618,707, now Patent No. 3,483,267, dated Dec. 9, 1969. Divided and this application Aug. 5, 1969, Ser. No. 847,652
Int. Cl. C01b *17/64*
U.S. Cl. 23—115       7 Claims

ABSTRACT OF THE DISCLOSURE

A primary amine is reacted with hydrogen sulfide and sulfur dioxide in the presence of a solvent to form the amine thiosulfate and sulfur which precipitates in the solvent. The thiosulfate can be freed of sulfur by dissolving the sulfur in a sulfur solvent such as carbon disulfide or by dissolving the thiosulfate in hot water. The amine thiosulfate, with or without removal of sulfur, is reacted with ammonia to form the ammonium thiosulfate and regenerate the amine. The ammonium thiosulfate is recovered by filtration and the regenerated amine cycled back to the first reaction zone.

---

This is a division of U.S. Ser. No. 618,707, filed Feb. 27, 1967, now Pat. No. 3,483,267.

FIELD OF THE INVENTION

This invention relates generally to organic thiosulfate manufacture. More specifically, this invention relates to a method of preparing thiosulfate from primary amines. In one aspect, this invention relates to a method of preparing ammonium thiosulfates by reacting the amine thiosulfate with ammonia.

Organic thiosulfates are difficult to synthesize, and few have been reported in the literature. However, such thiosulfates are useful as oxidation inhibitors, corrosion inhibitors, detergents, reducing agents and the like. The fact that no satisfactory commercial method has been devised to produce such thiosulfates probably accounts for the lack of literature available on the subject. Ammonium thiosulfate is useful as a photographic fixing agent, and is a valuable component for fertilizer. Although a number of methods are known for preparing ammonium thiosulfate, the method as herein described is inexpensive and simple in its operation, and the raw materials are plentiful and inexpensive.

SUMMARY OF THE INVENTION

In one aspect a primary amine is reacted with sulfur dioxide and hydrogen sulfide to form the amine thiosulfate. Preferably, the reaction is carried out in a solvent for the amine and wherein the amine thiosulfate is precipitated. In a second aspect, an amine thiosulfate is reacted with ammonia to form ammonium thiosulfate and the amine. In still a third aspect, a unitary method for preparing ammonium thiosulfate comprises reacting a primary amine with sulfur dioxide and hydrogen sulfide in the presence of an amine solvent to precipitate the amine thiosulfate, separating the thiosulfate from mother liquor and recycling mother liquor to the first reaction step, contacting the separated amine thiosulfate with ammonia to form ammonium thiosulfate and releasing the amine, recovering the ammonium thiosulfate as product and recycling the amine back to the amine thiosulfate reaction zone.

THE DRAWING

The drawing is a block flow diagram illustrating the preferred method for practicing the invention.

DESCRIPTION OF THE INVENTION

In carrying out the first aspect of this invention, a primary amine is reacted with a sulfur dioxide containing gas to form an addition complex which in turn reacts with hydrogen sulfide in a gas containing same according to the formula:

$$4RNH_2 + 3SO_2 + 2H_2S \rightarrow 2(RNH_2)_2H_2S_2O_3 + S$$

wherein R is an organic radical preferably of 1 to 18 carbon atoms. Preferably, the reaction will be carried out in the presence of a solvent for the amine and in which the amine thiosulfate will precipitate. R can be paraffinic, olefinic, cycloparaffinic or aromatic and will generally be a hydrocarbon. However, these hydrocarbons can be substituted with non-interfering substituents such as oxygen, halides, and the like.

Examples of suitable amines include, but are not limited to, methylamine, ethylamine, isopropylamine, butylamine, hexylamine, aniline, toluidine, phenylenediamine, cocodiamine, iso-oleyldiamine, oleyldiamine, tallowamine and the like.

The sulfur dioxide and hydrogen sulfide can be pure gases, but will more generally be in admixture with other gases. Sulfur dioxide is found in by-product gases from metal manufacture such as ore roasting while hydrogen sulfide is a by-product from many petroleum refining operations and in both of these cases provides a troublesome disposal problem. Therefore, such gases are generally preferred in our process. In the amine thiosulfate forming reaction, some sulfur is produced which can be recovered, burned to $SO_2$ and utilized in the primary reaction. On the other hand, if the thiosulfate is to be converted to ammonium thiosulfate for agricultural purposes, the sulfur can be left in the amine thiosulfate and go along with the final ammonim thiosulfate product.

Suitable solvents include aldehydes, ketones, alcohols, etc. which are liquid at the operation conditions and can be primary, secondary, or tertiary and can be aliphatic or cyclic, and the like. Particularly preferred are the normal aliphatic 1-ols of 1 to 6 carbon atoms. Examples of suitable solvents include methanol, ethanol, n-propanol, iso-propanol, n-butanol, n-hexanol, secondary butanol, tertiary pentanol, cyclohexanol and similar alcohols, acetone, diethylketone, methylethylketone, diisopropylketone, ethylpropylketone, methylisoamylketone, benzylalcohol, benzylaldehyde, acetophenone, methylethylphenol, benzophenone, o-chlorobenzylaldehyde, acetaldehyde, propionic aldehyde, n-valeric aldehyde, and the like.

DESCRIPTION OF THE DRAWING

Our invention will be further illustrated by reference to the drawing. For the purpose of this illustration, we will use aniline as our amine, ethanol as the solvent and carbon disulfide as a solvent for the removal of elemental sulfur formed in the first reaction.

Aniline thiosulfate and elemental sulfur are formed in reaction zone 1 by reacting aniline supplied via conduit 2 with a hydrogen sulfide containing gas supplied via conduit 3 and sulfur dioxide containing gas supplied via conduit 4. Some solvent and inerts, such as nitrogen, which are introduced with the gas pass overhead from reactor 1 via conduit 5 to condenser 6. The solvent will be condensed and passed via conduit 7 to filter 8 as wash solvent. The uncondensed gases are vented via conduit 9. The aniline thiosulfate and elemental sulfur passes via conduit 10 to aforesaid filter 8 where the solids and liquid are separated. In order that all of the sulfur dioxide and hydrogen sulfide are utilized, some excess aniline is present in reactor 1. This aniline is removed by washing with the condensed solvent supplied via conduit 7 and the mother liquor (alcohol and aniline) is returned to reactor 1 via conduit 11. Any loss of solvent is made up by supplying make-up solvent to reactor 1 via conduit 12.

As previously indicated, if the final product is to be ammonium thiosulfate for fertilizer-use, the sulfur need not be separated from the aniline thiosulfate. However, assuming we wish to recover the aniline thiosulfate in pure form, the aniline thiosulfate and sulfur must be separated. This can be accomplished by two methods. First, we can use a solvent for the aniline thiosulfate and non-solvent for the sulfur such as water. This is a less preferred method since we then have a problem of recovering the product from the solvent, e.g. distillation, spray drying, crystallization or the like. Secondly, we can use a solvent for the sulfur and non-solvent for the aniline thiosulfate. Preferably, this solvent should be a low boiling solvent to facilitate the removal of the solvent from the sulfur by low temperature distillation. Carbon disulfide is ideally suited for this purpose.

After the filter cake (aniline thiosulfate) has been washed free of aniline, the filter cake is washed by carbon disulfide supplied via conduit 13 which dissolves the elemental sulfur and passes via conduit 14 to distillation zone 15 where the carbon disulfide is distilled off and recycled to filter 8 via conduit 16 and make-up conduit 13. The sulfur can be recovered as such via conduit 17, but we prefer to pass it to sulfur burner 18 where it is oxidized to sulfur dioxide and pass to sulfur dioxide conduit 4 via conduit 19.

If we are interested in recovering the amine thiosulfate, the washed filter cake is removed via conduit 20 and dried. In this example, however, we wish to prepare ammonium thiosulfate.

The aniline thiosulfate is passed via conduit 20 to reaction zone 21 where it is contacted with ammonia liquid or gas supplied via conduit 22 thus converting the aniline thiosulfate to ammonium thiosulfate and freeing the aniline according to the reaction:

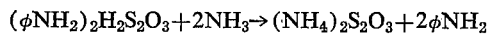

$(\phi NH_2)_2 H_2 S_2 O_3 + 2NH_3 \rightarrow (NH_4)_2 S_2 O_3 + 2\phi NH_2$

The slurry of ammonium thiosulfate in aniline passes via conduit 23 to filter 24 where the solids are separated from the liquids or liquids and gases. The liquids and gases pass via conduit 25 to condenser 26 where the temperature is cold enough to condense the aniline but not cold enough to condense ammonia. The ammonia is recycled via conduits 27 and 22 back to reactor 21. The wet solids from filter 24 pass via conduit 28 to drier 29 where any ammonia and aniline are driven off via conduit 30 and sent to condenser 26. From condenser 26, the aniline is removed via conduit 31 and returned to reactor 1 via conduit 2. The pure ammonium thiosulfate is removed from drier 29 via conduit 32 and sent to storage (not shown).

In describing our invention, we have described the combined, unitary process utilizing the preferred materials. It should be understood that other amines, solvents, and the like as disclosed would operate in the same manner. Valves, pumps, and the like have been omitted for simplicity; these being conventional and well within the skill of the art to provide. Specific operating temperatures, pressures and the like have not been disclosed as such are readily obtainable from the tables of the various handbooks for the specific materials employed. Other modifications can be made which will be obvious to those skilled in the art without departing from the scope of the invention. For example, we have assumed that the hydrogen sulfide and the sulfur dioxide are added in stoichiometric ratios. It would be obvious that if an excess of hydrogen sulfide were added, it would be vented via conduit 9 whereas a small excess of sulfur dioxide would form the amine-sulfur dioxide complex and be recycled until all of the amine was reacted. Afterwards, any excess sulfur dioxide would pass overhead and be vented via conduit 9.

Having thus described the invention, we claim:

1. A process for the preparation of ammonium thiosulfate which comprises reacting a primary alkyl or mononuclear aryl amine having 1 to 18 carbon atoms in the hydrocarbon moiety in a solvent with sulfur dioxide and gaseous hydrogen sulfide in a first reaction zone to form an amine thiosulfate and sulfur, contacting the amine thiosulfate with ammonia in a second reaction zone to form ammonium thiosulfate and releasing the amine and separating the ammonium thiosulfate from the amine.

2. The process of claim 1 wherein the solvent is a nonsolvent for the amine thiosulfate and separating the amine thiosulfate from the mother liquor.

3. The process of claim 2 wherein said mother liquor is returned to said first reaction zone and wherein said released amine from said second reaction zone is returned to said first reaction zone.

4. The process of claim 3 wherein the amine thiosulfate from said first reaction zone is separated from said sulfur prior to contacting the amine thiosulfate with ammonia.

5. The process of claim 4 wherein said sulfur is separated from said amine thiosulfate by dissolving said sulfur in carbon disulfide and separating the amine thiosulfate from the resulting solution by filtration.

6. The process of claim 5 wherein said primary amine is an aromatic amine.

7. The process of claim 6 wherein said primary amine is aniline and said solvent is ethanol.

References Cited
UNITED STATES PATENTS

| | | | |
|---|---|---|---|
| 2,970,039 | 1/1961 | Vian-Ortuno et al. | 23—119 |
| 3,483,267 | 12/1969 | Grimsley et al. | 23—115X |

EARL C. THOMAS, Primary Examiner